United States Patent
Cain et al.

(10) Patent No.: US 7,454,518 B1
(45) Date of Patent: Nov. 18, 2008

(54) SYSTEM, DEVICE, AND METHOD FOR RECEIVER ACCESS CONTROL IN A MULTICAST COMMUNICATION NETWORK

(75) Inventors: Bradley Cain, Cambridge, MA (US); Thomas P. Hardjono, Winchester, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 459 days.

(21) Appl. No.: 09/660,110

(22) Filed: Sep. 12, 2000

(51) Int. Cl.
G06F 15/173 (2006.01)
G06F 15/16 (2006.01)
H04L 9/00 (2006.01)
(52) U.S. Cl. .................. 709/238; 709/227; 709/229; 709/244; 713/163
(58) Field of Classification Search ............. 709/249, 709/250, 251, 252, 253, 229, 238, 225
See application file for complete search history.

(56) References Cited

U.S. PATENT DOCUMENTS

| | | | |
|---|---|---|---|
| 5,748,736 A | | 5/1998 | Mittra |
| 6,026,167 A | | 2/2000 | Aziz |
| 6,058,416 A | | 5/2000 | Mukherjee et al. |
| 6,097,720 A | * | 8/2000 | Araujo et al. ............... 370/355 |
| 6,154,463 A | * | 11/2000 | Aggarwal et al. .......... 370/408 |
| 6,185,678 B1 | | 2/2001 | Arbaugh et al. |
| 6,295,361 B1 | | 9/2001 | Kadansky et al. |
| 6,363,154 B1 | | 3/2002 | Peyravian et al. |
| 6,415,323 B1 | * | 7/2002 | McCanne et al. .......... 709/225 |
| 6,451,323 B1 | * | 9/2002 | Garcia-Sastre et al. ... 424/214.1 |
| 6,606,706 B1 | | 8/2003 | Li |
| 6,614,781 B1 | * | 9/2003 | Elliott et al. ............... 370/352 |
| 6,664,922 B1 | | 12/2003 | Fan |
| 6,684,331 B1 | | 1/2004 | Srivastava |
| 6,718,387 B1 | | 4/2004 | Gupta et al. |
| 6,741,575 B1 | * | 5/2004 | Zhang et al. ............... 370/329 |
| 6,847,633 B1 | * | 1/2005 | Ryu et al. .................. 370/352 |

(Continued)

OTHER PUBLICATIONS

Ballardie, Tony and Crowcroft, Jon, Multicast-Specific Security Threats and Counter Measures, Apr. 1995, IEEE, pp. 2-16.*

(Continued)

*Primary Examiner*—Jason Cardone
*Assistant Examiner*—Azizul Choudhury
(74) *Attorney, Agent, or Firm*—David A. Dagg (57) ABSTRACT

A system, device, and method for receiver access control in a multicast communication network treats each subscriber location as a separate subnetwork having one and only one multicast receiver. An access device is situated at each subscriber location. Each access device connects to a separate port of a multicast distribution device. Each subscriber device accesses the multicast network through the access device that is situated at its subscriber location. Each access device acts as a proxy for its respective subscriber devices by joining and leaving multicast groups on behalf of the subscriber devices and acting as the sole multicast receiver for the subscriber location. The access devices run a multicast group management protocol for joining and leaving various multicast groups, and therefore the access devices appear to the multicast distribution device as the ultimate multicast receivers for multicast information. The access devices maintain group membership information their respective subscriber devices and distribute multicast information to their respective subscriber devices accordingly.

53 Claims, 5 Drawing Sheets

U.S. PATENT DOCUMENTS 7,296,091 B1* 11/2007 Dutta et al. ............... 709/245
7,360,084 B1* 4/2008 Hardjono ............... 713/163

OTHER PUBLICATIONS

Ballardie, Tony et al., "Multicast-Specific Security Threats and Counter-Measures," Apr. 1995, IEEE, pp. 2-16.*

Kaur, S. et al, "Multicast support for mobile IP using a modified IGMP," Sep. 1999, IEEE, vol. 2, pp. 948-952.*

Liao, Wanjiun et al, "Receiver-initiated Group Membership Protocol (RGMP): a New Group Management Protocol for IP Multicasting," Oct. 1999, IEEE, pp. 51-58.*

Ansari, F. et al, "IP Switching: Over Fast ATM Cell Transport (IPSOFACTO): IP Multicast over Wireless ATM," Oct. 1998, IEEE, vol. 1, pp. 621-626.*

Liao, Wanjiun et al, "Receiver-initiated Group Membership Protocol (RGMP): a New Group Management Protocol for IP Multicasting," Oct. 1999, IEEE, pp. 1-8.*

Simpson, W. "RFC 1661: The Point-to-Point Protocol," Jul. 1994, pp. 1-52.*

Fenner, "Internet Group Management Protocol, Version 2" Internet Engineering Task Force Request for Comments: 2236 Nov. 1997.

Cain et al., "Internet Group Management Protocol, Version 3" Internet Engineering Task Force Internet Draft draft-ietf-idmr-igmp-v3-04.txt Jun. 2000.

Ballardie A. "Scalable Multicast Key Distribution", May 1996, University of London, pp. 1-18.

Haller et al. "On Internet Authentication", Oct. 1994, Network Working Group, pp. 1-17.

Harney et al. "Group Key Management Protocol (GKMP) Specification", Jul. 1997, Network Working Group, pp. 1-23.

Gong et al. "Elements of Trusted Multicasting", 1994, IEEE, SRI Computer Science Laboratory, pp. 23-29.

Mittra S. "Iolus: A Framework for Scalable Secure Multicasting", 1997, Computer Science Department, Stanford University, pp. 277-288.

Ishikawa et al. "An Architecture for User Authentication of IP Multicast and its Implementation", 1999, IEEE, pp. 81-87.

* cited by examiner

SYSTEM, DEVICE, AND METHOD FOR RECEIVER ACCESS CONTROL IN A MULTICAST COMMUNICATION NETWORK

FIELD OF THE INVENTION

The present invention relates generally to communication systems, and more particularly to an architecture for receiver access control and accounting in a multicast communication network.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One problem that plagues many multicast communication networks is security, or more specifically, the lack thereof. Many multicast communication networks are based upon an anonymous receiver model in which any host can join the shared tree, for example, using multicast group management protocol such as the Internet Group Management Protocol (IGMP). IGMP is described in Fenner, Internet Engineering Task Force (IETF) Request for Comments (RFC) 2236 entitled *Internet Group Management Protocol, Version 2* (November 1997) and in Cain et al., Internet Engineering Task Force (IETF) Internet Draft draft-ietf-idmr-igmp-v3-04.txt entitled *Internet Group Management Protocol*, Version 3 (June 2000), which are hereby incorporated herein by reference in their entireties. This anonymous receiver model exposes the shared tree to various types of attacks.

One attempt to protect the shared tree involves the use of data encryption to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Another attempt to protect the shared tree involves the authentication of control messages between multicast routers. Specifically, the multicast routers exchange various control messages for, among other things, joining the shared tree. These control messages are authenticated hop-by-hop according to a predetermined authentication scheme. By authenticating all control messages, only authorized multicast routers are able to join the shared tree.

Unfortunately, neither data encryption nor control message authentication prevents an unauthorized host from joining the shared tree and thereby consuming valuable communication resources. Because authentication operates only between the multicast routers, an unauthorized host can still join the shared tree, specifically by sending a join request, for example, using IGMP or other group management mechanism. The multicast routers establish the appropriate multicast routes for routing multicast packets to the unauthorized host, perhaps even using authentication to perform hop-by-hop authentication. As a member of the shared tree, the unauthorized host receives multicast packets. This is true even if the multicast packets are protected using data encryption, in which case the unauthorized host simply discards the encrypted multicast data.

Thus, a technique for controlling access in a multicast communication network is needed.

SUMMARY OF THE INVENTION

In accordance with one aspect of the invention, each subscriber location is treated as a separate subnetwork having one and only one multicast receiver. An access device is situated at each subscriber location. Each access device connects to a separate port of a multicast distribution device. Each subscriber device accesses the multicast network through the access device that is situated at its subscriber location. Each access device acts as a proxy for its respective subscriber devices by joining and leaving multicast groups on behalf of the subscriber devices and acting as the sole multicast receiver for the subscriber location. The access devices run a multicast group management protocol for joining and leaving various multicast groups, and therefore the access devices appear to the multicast distribution device as the ultimate multicast receivers for multicast information. The access devices maintain group membership information their respective subscriber devices and distribute multicast information to their respective subscriber devices accordingly.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention provides receiver access control and accounting in a multicast network by treating each subscriber location as a separate subnetwork having one and only one multicast receiver. Specifically, an access device is situated at each subscriber location. Each access device connects to a separate port of a multicast distribution device (e.g., multicast router or server). Each subscriber device accesses the multicast network through the access device that is situated at its subscriber location. Each access device acts as a proxy for its respective subscriber devices by joining and leaving multicast groups on behalf of the subscriber devices and acting as the sole multicast receiver for the subscriber location. The access devices are not part of the multicast network in that the access devices do not run a multicast routing protocol (e.g., PIM). Instead, the access devices run a multicast group management protocol (e.g., IGMP) for joining and leaving various multicast groups, and therefore the access devices appear to the multicast distribution device as the ultimate multicast receivers for multicast information. The access devices maintain group membership information their respective subscriber devices and distribute multicast information to their respective subscriber devices accordingly.

Because each subnetwork has one and only one multicast receiver (i.e., the access device situated at the subscriber location), multicast group management protocol messages emanate from one and only one source per subnetwork (i.e., the access device situated at the subscriber location). Using an access control database that is preconfigured with information about the access devices, the multicast distribution device is able to identify and authenticate the source of each multicast group management protocol message, and is also able to track network utilization for each subscriber location (such as the multicast group memberships, the duration of multicast group memberships, and the amount of data delivered for each multicast group membership). The multicast distribution device does not identify, authenticate, and track individual subscriber devices, and therefore subscriber devices can be added or removed from subscriber locations without affecting the multicast distribution device.

Figure 1:
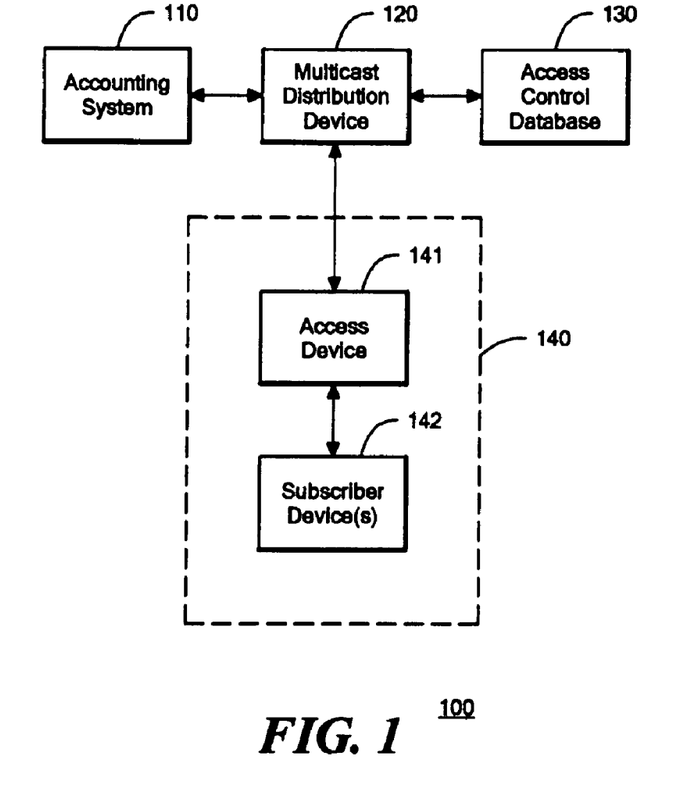
FIG. 1 is a system diagram showing an exemplary communication system in accordance with an embodiment of the present invention.

FIG. 1 shows an exemplary communication system 100 in accordance with an embodiment of the present invention. The communication system 100 includes a multicast distribution device 120 coupled to an accounting system 110, an access control database 130, and a number of subscriber locations. For the sake of simplicity, only one subscriber location 140 is shown. Each subscriber location, including the subscriber location 140, includes an access device 141 and one or more subscriber device(s) 142. Each access device, including the access device 141, is coupled to a separate port of the multicast distribution device 120.

Architecturally, the communication system 100 may be used in many applications. For example, the communication system 100 may be used in a hotel or apartment building, where each hotel room or apartment represents a subscriber location. A single multicast distribution device may be used to distribute multicast information to the various hotel rooms or apartments. In order to support receiver access control and accounting, each hotel room or apartment is associated with an access device through which subscriber devices access the multicast network. In such a communication system, the multicast distribution device may be, for example, a multicast router that is part of a larger multicast network (e.g., a designated router in a PIM network) or a multicast server (e.g., a video server in a video-on-demand network). The access device is typically a switch.

In order for a subscriber device to join a particular multicast group, the subscriber device sends a join request to the access device, for example, using a multicast group management protocol such as IGMP. Upon receiving the join request from the subscriber device, the access device determines whether the access device is already joined to the multicast group, specifically by checking a membership database that is maintained by the access device. If the access device is already joined to the multicast group, then the access device begins forwarding multicast information for the multicast group to the subscriber device. However, if the access device is not already joined to the multicast group, then the access device sends a join request to the multicast distribution device, for example, using a multicast group management protocol such as IGMP. Upon joining the multicast group, the access device updates its membership database and begins forwarding multicast information for the multicast group to the subscriber device. The multicast distribution device establishes appropriate multicast routes for routing multicast information for the multicast group to the access device.

Figure 2:
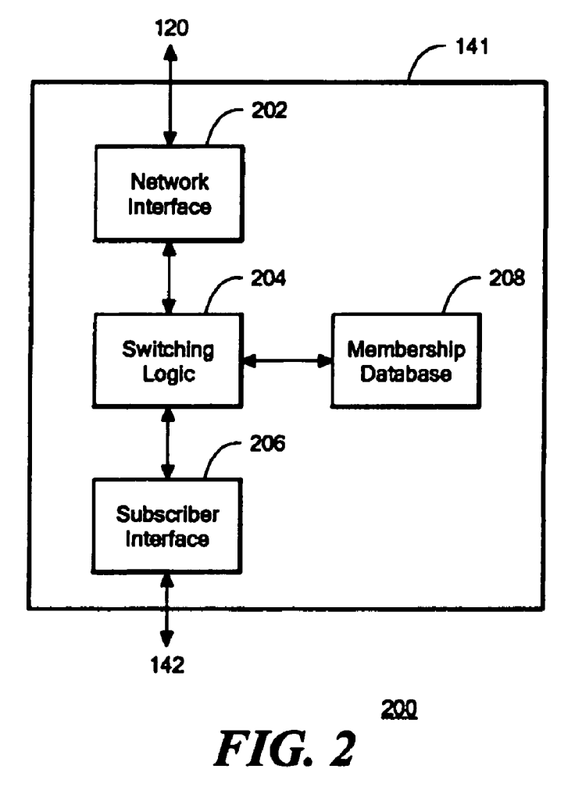
FIG. 2 is a block diagram showing the relevant logic blocks of an exemplary access device in accordance with an embodiment of the present invention.

FIG. 2 is a block diagram 200 showing the relevant logic blocks of an exemplary access device 141. The access device 141 includes, among other things, a network interface 202 for coupling with the multicast distribution device 120, switching logic 204, a subscriber interface 206 for coupling with the subscriber device(s) 142, and a membership database 208.

The switching logic 204 supports a first multicast group management protocol for communicating with the subscriber device(s) 142 over the subscriber interface 206 as well as a second multicast group management protocol for communicating with the multicast distribution device 120 over the network interface 202. In a typical embodiment of the present invention, both the first multicast group management protocol and the second multicast group management protocol are IGMP. In this way, the presence of the access device 141 between the multicast distribution device 120 and the subscriber device(s) 142 is substantially transparent, since the multicast distribution device 120 and the subscriber device(s) 142 utilize IGMP as they would without the access device 141 present.

The switching logic 204 joins and leaves multicast groups on behalf of the subscriber devices 142. The switching logic 204 maintains multicast group membership information in the membership database 208. The multicast group membership information includes the multicast groups joined by the switching logic 204 and a list of subscriber devices associated with each multicast group membership.

When the switching logic 204 receives a join request from a subscriber device 142 over the subscriber interface 206 for joining a multicast group, the switching logic 204 checks the membership database 208 to determine whether there is already a membership for the multicast group. If there is already a membership for the multicast group, then the switching logic 204 adds the subscriber device 142 to the list of subscriber devices associated with the multicast group. If there is not already a membership for the multicast group, then the switching logic 204 sends a join request to the multicast distribution device 120 over the network interface 202 in order to join the multicast group on behalf of the subscriber device 142. The switching logic 204 updates the membership information in the membership database 208 to add the multicast group membership to the membership database 208 and also to add the subscriber device to the list of subscriber devices associated with the multicast group.

Figure 3:
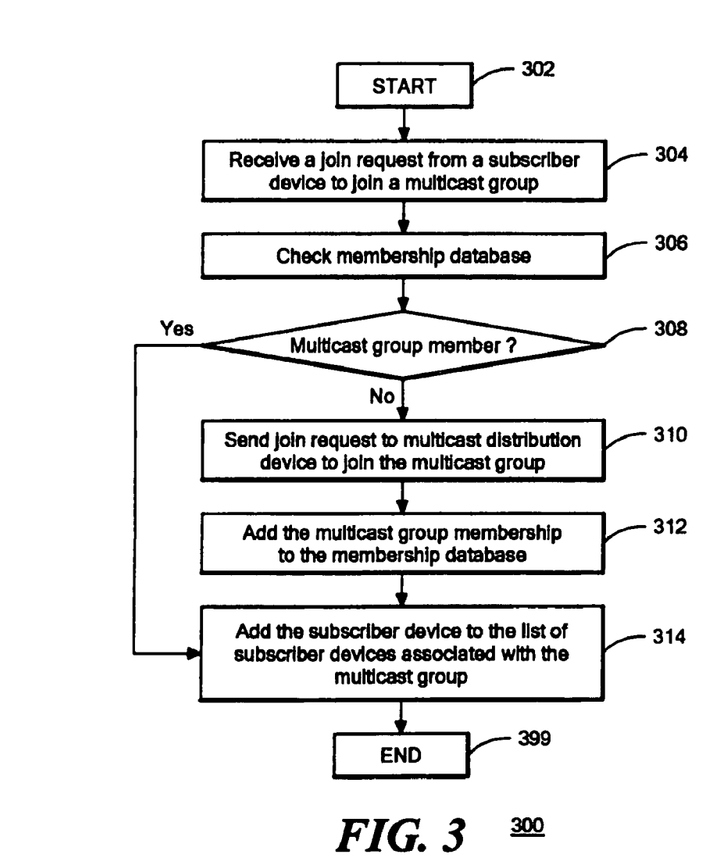
FIG. 3 is a logic flow diagram showing exemplary access device switching logic for processing a join request from a subscriber device in accordance with an embodiment of the present invention.

FIG. 3 is a logic flow diagram showing exemplary switching logic 300 for processing a join request from a subscriber device. Beginning at block 302, and upon receiving a join request from a subscriber device to join a multicast group, in block 304, the logic checks the membership database to determine whether there is already a membership for the multicast group, in block 306. If there is already a membership for the multicast group (YES in block 308), then the logic adds the subscriber device to the list of subscriber devices associated with the multicast group, in block 314). If there is not already a membership for the multicast group (NO in block 308), then the logic sends a join request to the multicast distribution device to join the multicast group on behalf of the subscriber device, in block 310. Once the multicast group membership is established, the logic adds the multicast group membership to the membership database, in block 312, and also adds the subscriber device to the list of subscriber devices associated with the multicast group, in block 314. The logic 300 terminates in block 399.

When the multicast distribution device 120 receives the join request from the access device 141 for joining the multicast group, the multicast distribution device 120 identifies the access device 141, for example, based upon the port over which the join request is received. In addition to identifying the access device 141, the multicast distribution device 120 may also authenticate the access device 141 using a predetermined authentication scheme such as IPsec AH together with various access control information obtained from the access control database 130 (e.g., an authentication key for the access device). Assuming that the access device 141 is authentic (i.e., identified and/or authenticated by the multicast distribution device 120), the multicast distribution device 120 establishes appropriate multicast routes for forwarding multicast information for the multicast group to the access device 141. This may involve, for example, joining a shared multicast distribution tree for the multicast group using a predetermined multicast routing protocol such as PIM. The multicast distribution device 120 then forwards multicast information for the multicast group to the access device 141.

Figure 6:
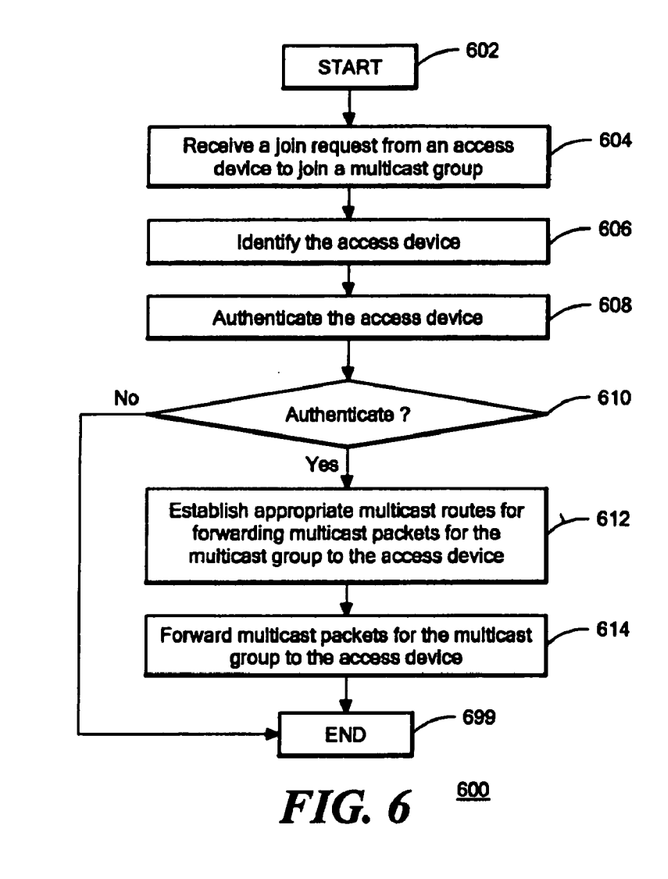
FIG. 6 is a logic flow diagram showing exemplary multicast distribution device logic for processing a join request from an access device in accordance with an embodiment of the present invention.

FIG. 6 is a logic flow diagram showing exemplary multicast distribution device logic 600 for processing a join request from an access device. Beginning at block 602, and upon receiving a join request from an access device to join a multicast group, in block 604, the logic identifies the access device, in block 606, for example, based upon the port over which the join request is received. The logic may authenticate the access device further, in block 608, using a predetermined authentication scheme. If the access device is authentic (YES in block 610), then the logic establishes appropriate multicast routes for forwarding multicast packets for the multicast group to the access device, in block 612, and thereafter forwards multicast packets for the multicast group to the access device, in block 614. If the access device is not authentic (NO in block 610), then the logic does not establish appropriate multicast routes for forwarding multicast packets for the multicast group to the access device and does not forward multicast packets for the multicast group to the access device. The logic 600 terminates in block 699.

After the switching logic 204 establishes a multicast group membership on behalf of one or more subscriber devices, the switching logic 204 receives multicast information from the multicast distribution device 120 over the network interface 202 and forwards the multicast information to all subscriber devices in the list of subscriber devices associated with the multicast group. Specifically, when the switching logic 204 receives a multicast packet for a multicast group from the multicast distribution device 120 over the network interface 202, the switching logic 204 checks the membership database 208 to determine whether there is a multicast group membership for the multicast group. If there is a multicast group membership for the multicast group, then the switching logic 204 obtains the list of subscriber devices associated with the multicast group from the membership database and forwards the multicast packet to the subscriber devices associated with the multicast group. If there is not a multicast group membership for the multicast group, then the switching logic 204 does not forward the multicast packet to the subscriber devices (i.e., the switching logic 204 drops the multicast packet).

Figure 4:
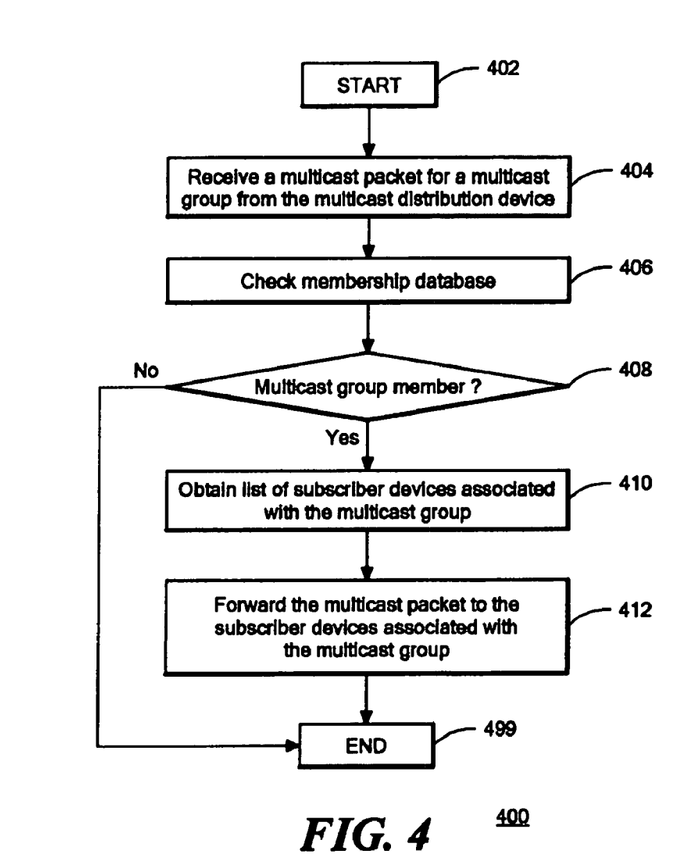
FIG. 4 is a logic flow diagram showing exemplary access device switching logic for processing a multicast packet received from the multicast distribution device in accordance with an embodiment of the present invention.

FIG. 4 is a logic flow diagram showing exemplary switching logic 400 for processing a multicast packet. Beginning at block 402, and upon receiving a multicast packet for a multicast group from the multicast distribution device, in block 404, the logic checks the membership database to determine whether there is a membership for the multicast group, in block 406. If there is a membership for the multicast group (YES in block 408), then the logic obtains the list of subscriber devices associated with the multicast group from the membership database, in block 410, and forwards the multicast packet to the subscriber devices associated with the multicast group, in block 412. If there is not already a membership for the multicast group (NO in block 408), then the logic drops the packet. The logic 400 terminates in block 499.

The switching logic 204 maintains a particular multicast group membership as long as there is at least one subscriber device 142 that is joined to the multicast group. The switching logic 204 may use various means for determining whether a particular subscriber device remains a member of a particular multicast group. For example, the switching logic 204 may utilize the IGMP query/report mechanism to determine the multicast group memberships for all subscriber devices, in which case the switching logic 204 sends IGMP query messages to the subscriber devices and the subscriber devices report their multicast group memberships in IGMP report messages. Alternatively, the subscriber devices may send explicit leave requests to the access device 141 for leaving multicast groups.

In any case, when the switching logic 204 determines that a particular subscriber device is no longer a member of a particular multicast group, the switching logic 204 removes the subscriber device from the list of subscriber devices associated with the multicast group in the membership database 208. The switching logic 204 then determines whether there are any remaining members of the multicast group, specifically by determining whether there are any remaining subscriber devices in the list of subscriber devices associated with the multicast group. If there are no remaining members of the multicast group, then the switching logic 204 leaves the multicast group, for example, by omitting the multicast group from IGMP report messages sent to the multicast distribution device 120 or by sending an explicit leave request to the multicast distribution device 120.

Figure 5:
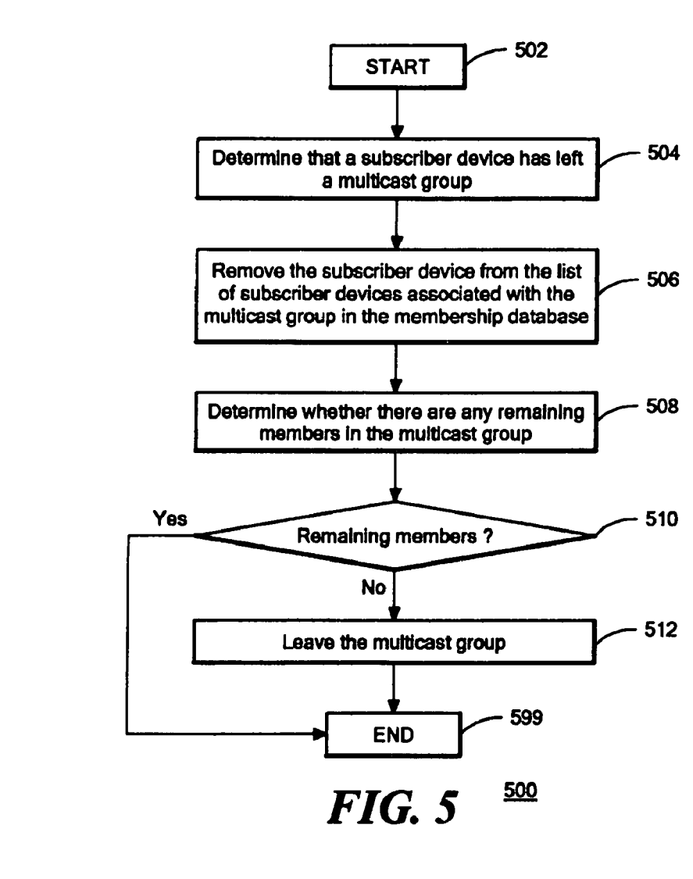
FIG. 5 is a logic flow diagram showing exemplary access device switching logic when a subscriber device leaves a multicast group in accordance with an embodiment of the present invention.

FIG. 5 is a logic flow diagram showing exemplary switching logic 500 when a subscriber device leaves a multicast group. Beginning at block 502, and upon determining that a subscriber device has left a multicast group, in block 504, the logic removes the subscriber device from the list of subscriber devices associated with the multicast group in the membership database, in block 506. The logic then determines whether there are any remaining members of the multicast group, specifically by determining whether there are any remaining subscriber devices in the multicast group, in block 508, specifically by determining whether there are any remaining subscriber devices in the list of subscriber devices associated with the multicast group. If there are no remaining members of the multicast group (NO in block 510), then the logic leaves the multicast group, in block 512. If there is at least one remaining member of the multicast group (YES in block 510), then the logic maintains the multicast group membership. The logic 500 terminates in block 599.

When the multicast distribution device 120 determines that the access device 141 is no longer a member of a particular multicast group, the multicast distribution device 120 stops forwarding multicast information for the multicast group to the access device 141. The multicast distribution device 120 may also remove itself from a shared multicast distribution tree for the multicast group, for example, using a multicast routing protocol such as PIM.

Figure 7:
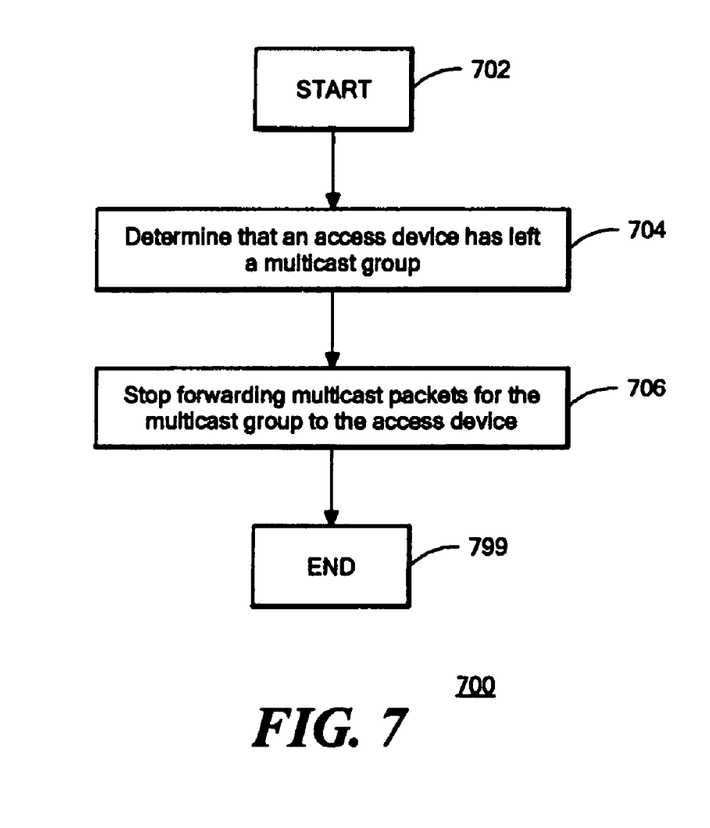
FIG. 7 is a logic flow diagram showing exemplary multicast distribution device logic when an access device leaves a multicast group in accordance with an embodiment of the present invention.

FIG. 7 shows exemplary multicast distribution device logic when an access device leaves a multicast group. Beginning at block 702, and upon determining that an access device has left a multicast group, in block 704, the multicast distribution device stops forwarding multicast packets for the multicast group to the access device, in block 706. The logic 700 terminates in block 799.

Figure 8:
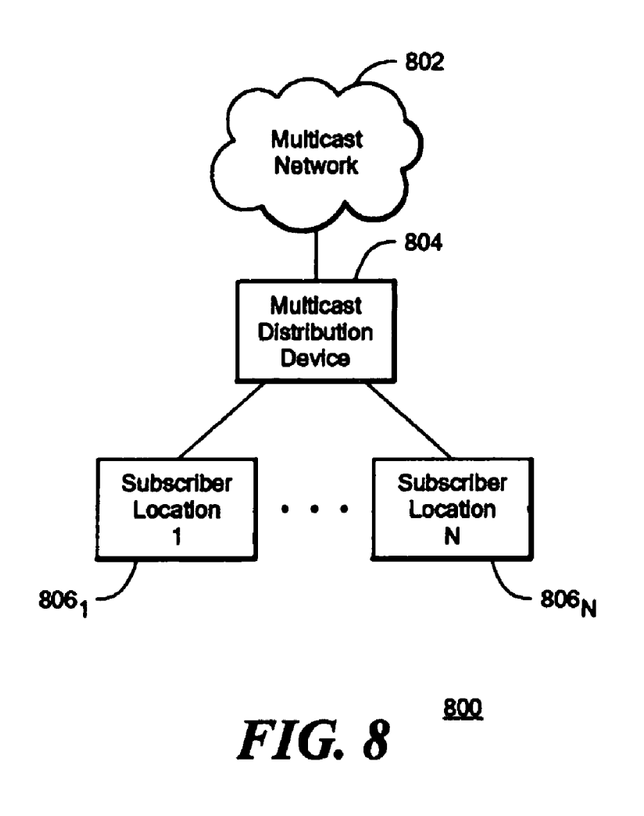
FIG. 8 is a system diagram showing an exemplary communication system in accordance with an embodiment of the present invention in which the multicast distribution device is a multicast router in a multicast network.

FIG. 8 shows an exemplary communication system 800 in which the multicast distribution device is a multicast router in a multicast network. The communication system 800 includes a multicast distribution device 804 coupled to a multicast network 802 and to a number of subscriber locations $806_1$ through $806_N$. The multicast distribution device 804 maintains multicast group membership information for forwarding multicast information to the subscriber locations $806_1$ through $806_N$. The multicast distribution device 804 joins multicast groups in the multicast network 802 on behalf of the access devices in the subscriber locations $806_1$ through $806_N$ and forwards the multicast information received over the multicast network 802 to the appropriate subscriber locations $806_1$ through $806_N$ based upon the multicast group memberships of the access devices in the subscriber locations $806_1$ through $806_N$.

Figure 9:
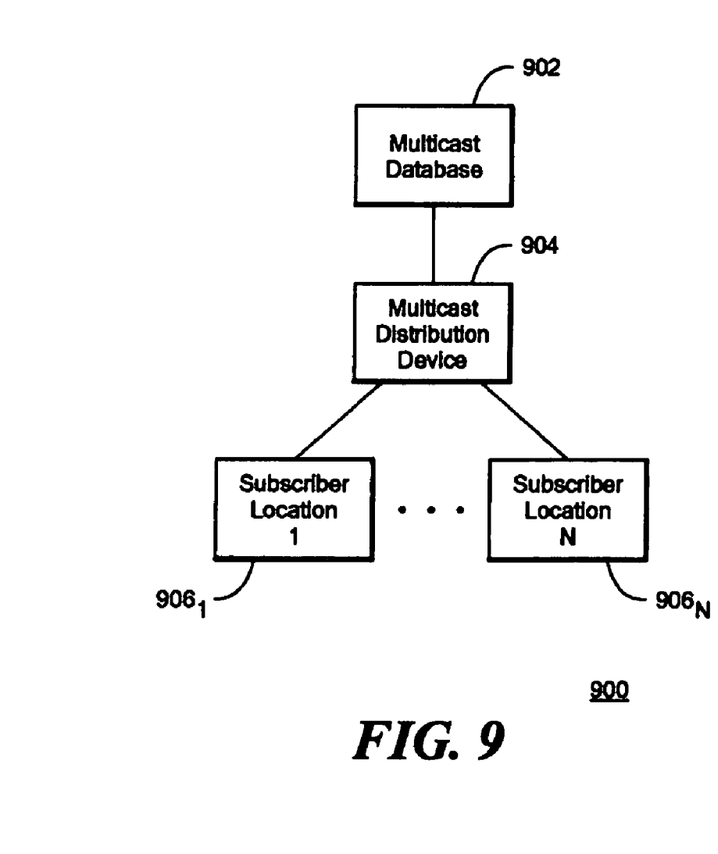
FIG. 9 is a system diagram showing an exemplary communication system in accordance with an embodiment of the present invention in which the multicast distribution device is a multicast server.

FIG. 9 shows an exemplary communication system 900 in which the multicast distribution device is a multicast server. The communication system 900 includes a multicast distribution device 904 coupled to a multicast database 902 and to a number of subscriber locations $906_1$ through $906_N$. The multicast distribution device 904 maintains multicast group membership information for forwarding multicast information to the subscriber locations $906_1$ through $906_N$. The multicast distribution device 904 obtains multicast information (such as pay-per-view television information) from the multicast database 902 and forwards the multicast information to the appropriate subscriber locations $906_1$ through $906_N$ based upon the multicast group memberships of the access devices in the subscriber locations $906_1$ through $906_N$.

Figure 10:
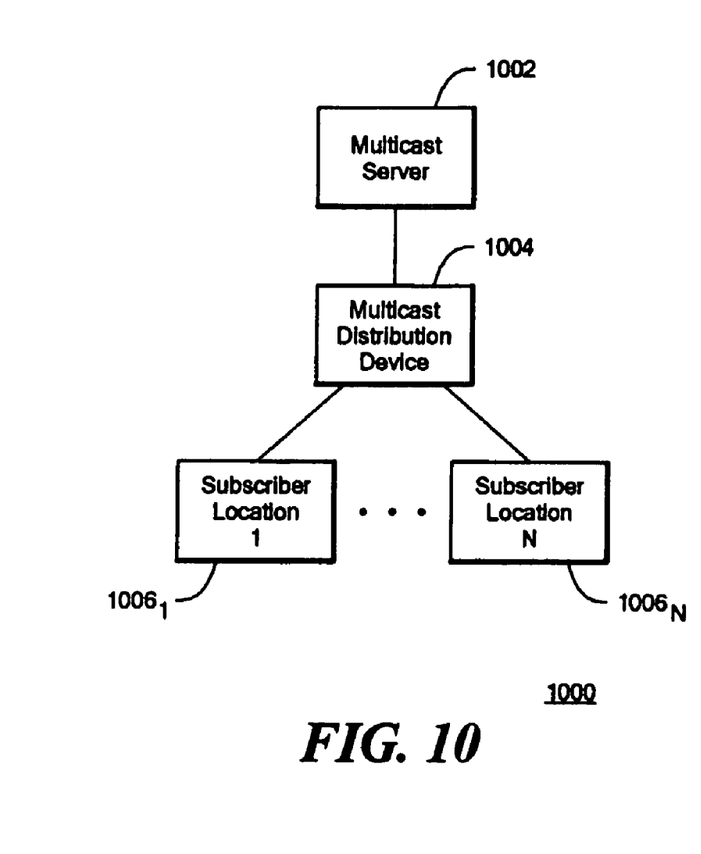
FIG. 10 is a system diagram showing an exemplary communication system in accordance with an embodiment of the present invention in which the multicast distribution device is a multicast switch.

FIG. 10 shows an exemplary communication system 1000 in which the multicast distribution device is a multicast switch. The communication system 1000 includes a multicast distribution device 1004 coupled to a multicast server 1002 and to a number of subscriber locations $1006_1$ through $1006_N$. The multicast distribution device 1004 maintains multicast group membership information for forwarding multicast information to the subscriber locations $1006_1$ through $1006_N$. The multicast distribution device 1004 forwards multicast information received from the multicast server 1002 to the appropriate subscriber locations $1006_1$ through $1006_N$ based upon the multicast group memberships of the access devices in the subscriber locations $1006_1$ through $1006_N$.

Architecturally, an embodiment of the present invention facilitates accounting functions performed by the multicast distribution device 120. Because the multicast distribution device 120 maintains multicast group memberships for the access devices and not for the individual subscriber devices, the multicast distribution device 120 is able to maintain accounting information for each access device rather than for the individual subscriber devices. For each access device, the multicast distribution device 120 typically tracks such things as the multicast group memberships, the duration of each multicast group membership, and the volume of data delivered for the duration of each multicast group membership. Billing is also simplified, since all billable items for a particular access device correspond to one and only one subscriber location. The multicast distribution device 120 maintains accounting/billing information in the accounting system 110.

It should be noted that terms such as "router," "switch," and "server" are used herein to describe various communication devices that may be used in a communication system, and should not be construed to limit the present invention to any particular communication device type. Thus, a communication device may include, without limitation, a bridge, router, bridge-router (brouter), switch, node, server, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the switching logic 204 for joining multicast groups on behalf of the subscriber devices, leaving multicast groups on behalf of the subscriber devices, maintaining multicast group memberships, and forwarding multicast packets to the subscriber devices is implemented as a set of computer program instructions that is converted into a computer executable form, stored as such in a computer readable medium, and executed by a microprocessor within the access device 141 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a multicast communication system having a plurality of subscriber locations. Each subscriber location hasg an access device through which a number of subscriber devices access multicast information sent by a multicast distribution device. Each access device acts as a sole multicast receiver for its respective subscriber location and distributes multicast information received from the multicast distribution device to the subscriber devices at its respective subscriber location. The multicast distribution device distributes multicast information for a number of multicast groups, and each access device uses a predetermined multicast group management protocol (e.g., IGMP) to join the multicast groups on behalf its respective subscriber devices.

The present invention may also be embodied as a multicast communication system having a multicast distribution device coupled to a plurality of subscriber locations, wherein each subscriber location is a separate subnetwork of the multicast distribution device. Typically, each subscriber location has one and only one access device through which subscriber devices at the subscriber location access multicast information distributed by the multicast distribution device. Each access device is typically connected to a separate interface of the multicast distribution device, and the multicast distribution device identifies each access device based upon the interface to which the access device is connected. Each access device joins multicast groups maintained by the multicast distribution device on behalf of its respective subscriber devices using a multicast group management protocol. The multicast distribution device sends multicast information to the access devices based upon multicast group memberships of the access devices, and each access device distributes multicast information received from the multicast distribution device to its respective subscriber devices. The multicast distribution device maintains accounting information for each subnetwork.

The present invention may also be embodied as an access control method for use in a communication system having a multicast distribution device coupled to a plurality of subscriber locations. Each subscriber location has an access device and at least one subscriber device. The access control method involves maintaining a number of multicast groups by the multicast distribution device and joining one of the multicast groups by a first subscriber device. Joining one of the multicast groups by the first subscriber device involves sending a first join request by the first subscriber device to an access device using a first multicast group management protocol, joining the multicast group by the access device on behalf of the first subscriber device, and associating the first subscriber device with the multicast group by the access device. Joining the multicast group by the access device on behalf of the first subscriber device involves sending a second join request by the access device to the multicast distribution device using a second multicast group management protocol and authenticating the access device by the multicast distribution device. Authenticating the access device by the multicast distribution device involves identifying the access device by the multicast distribution device. The access device is typically coupled to an interface of the multicast distribution device, in which case identifying the access device by the multicast distribution device involves identifying the access device based upon the interface over which the second join request is received by the multicast distribution device. Authenticating the access device by the multicast distribution device may also involve authenticating the access device using a predetermined authentication scheme such as IPsec AH. The multicast distribution device establishes a multicast group membership for the access device upon determining that the access device is authentic, but denies a multicast group membership for the access device upon determining that the access device is not authentic. The access device typically maintains a list of subscriber devices associated with the multicast group and adds the first subscriber device to the list of subscriber devices associated with the multicast group.

The access control method may also involve leaving the multicast group by the first subscriber device, leaving the multicast group by the access device on behalf of the first subscriber device, and disassociating the first subscriber device from the multicast group by the access device.

The access control method may also involve joining the multicast group by a second subscriber device. Joining the multicast group by the second subscriber device involves sending a third join request by the second subscriber device to the access device using a third multicast group management protocol and associating the second subscriber device with the multicast group by the access device.

The access control method may also involve leaving the multicast group by one of the first subscriber device and the second subscriber device, remaining joined to the multicast group by the access device on behalf of the remaining subscriber device, and disassociating said one of the first subscriber device and the second subscriber device from the multicast group by the access device.

The access control method may also involve maintaining accounting information by the multicast distribution device for each multicast group for each subscriber location.

The present invention may also be embodied as an apparatus for operating as a sole multicast receiver on behalf of a number of subscriber devices at a subscriber location in a multicast communication network. The apparatus includes a network interface couplable to a multicast distribution device, a subscriber interface couplable to the number of subscriber devices at the subscriber location, and switching logic interposed between the network interface and the subscriber interface. The switching logic joins multicast groups maintained by the multicast distribution device on behalf of the number of subscriber devices and forwards multicast information to the subscriber devices.

More specifically, the switching logic includes first multicast group management logic (e.g., IGMP logic) for controlling first multicast group memberships between the apparatus and the subscriber devices, second multicast group management logic (e.g., IGMP logic) for controlling second multicast group memberships between the apparatus and the multicast distribution device, and membership logic for maintaining said first and second multicast group memberships. The membership logic associates the first multicast group memberships with the second multicast group memberships, typically by maintaining a list of subscriber devices for each of said second multicast group memberships. The first multicast group management logic may receive a join request from a subscriber device for joining a multicast group, in which case the second multicast group management logic may join the multicast group on behalf of the first subscriber device and the membership logic associates the first subscriber device with the multicast group. The first multicast group management logic may determine that a subscriber device has left a multicast group, in which case the membership logic disassociates the subscriber device from the multicast group, and the second multicast group management logic determines whether there are any remaining subscriber devices associated with the multicast group based upon the membership information maintained by the membership logic. The second multicast group management logic remains a member of the multicast group upon determining that there is at least one remaining subscriber device associated with the multicast group, but leaves the multicast group upon determining that there are no remaining subscriber devices associated with the multicast group.

The present invention may also be embodied as a computer program for controlling a computer system. The computer program includes network interface logic for communicating with a multicast distribution device, subscriber interface logic for communicating with a number of subscriber devices at a subscriber location, and switching logic logically interposed between the network interface logic and the subscriber interface logic. The switching logic is programmed to join multicast groups maintained by the multicast distribution device on behalf of the number of subscriber devices and forward multicast information to the subscriber devices.

More specifically, the switching logic includes first multicast group management logic (e.g., IGMP) for controlling first multicast group memberships between the computer system and the subscriber devices, second multicast group management logic (e.g., IGMP) for controlling second multicast group memberships between the computer system and the multicast distribution device, and membership logic for maintaining said first and second multicast group memberships. The membership logic associates the first multicast group memberships with the second multicast group memberships, typically by maintaining a list of subscriber devices for each of said second multicast group memberships. The first multicast group management logic may receive a join request from a subscriber device for joining a multicast group, in which case the second multicast group management logic may join the multicast group on behalf of the first subscriber device and the membership logic associates the first subscriber device with the multicast group. The first multicast group management logic may determine that a subscriber device has left a multicast group, in which case the membership logic disassociates the subscriber device from the multicast group, and the second multicast group management logic determines whether there are any remaining subscriber devices associated with the multicast group based upon the membership information maintained by the membership logic. The second multicast group management logic remains a member of the multicast group upon determining that there is at least one remaining subscriber device associated with the multicast group, but leaves the multicast group upon determining that there are no remaining subscriber devices associated with the multicast group.

The computer program may be embodied in a computer readable medium or in a data signal.

The present invention may be embodied in other specific forms without departing from the true scope of the invention. The described embodiments are to be considered in all respects only as illustrative and not restrictive.

We claim:

1. A multicast communication system comprising a plurality of subscriber locations, each subscriber location having an access device through which a plurality of subscriber devices access multicast information sent by a multicast distribution device, wherein each access device acts as a sole multicast receiver for its respective subscriber location and distributes multicast information received from the multicast distribution device to the subscriber devices at its respective subscriber location, wherein each said access device operates by joining and leaving at least one multicast group as a substitute for the subscriber devices at its respective subscriber location, and wherein each said access device processes a first join request received from one of said subscriber devices by determining whether said access device is already joined to a multicast group indicated by said first join request, and, in the event that said access device is not already joined to said multicast group indicated by said first join request, sending a second join request to said multicast distribution device, wherein said second join request is a request for said access device to join said multicast group, wherein said access device does not forward said first join request to said multicast distribution service, wherein said joining said multicast group by said access device on behalf of said first subscriber device includes authenticating, in response to said second join request, said access device by said multicast distribution device, and wherein said multicast distribution device does not authenticate said subscriber devices at said subscriber location for said access device prior to said access device distributing to each of said subscriber devices at said subscriber location for said access device multicast information sent to said access device by said multicast distribution device over multicast routes established to said access device from said multicast distribution device in response to said multicast distribution device successfully authenticating said access device and said access device having joined said multicast group as a result of said successful authentication.

2. The multicast communication system of claim 1, wherein the multicast distribution device distributes multicast information for a number of multicast groups, and wherein each access device uses a predetermined multicast group management protocol to join the multicast groups on behalf of the subscriber devices at its respective subscriber location.

3. The multicast communication system of claim 2, wherein the predetermined multicast group management protocol is an Internet Group Management Protocol (IGMP).

4. A multicast communication system comprising a multicast distribution device coupled to a plurality of subscriber locations, wherein each subscriber location is a separate subnetwork of the multicast distribution device, wherein each subscriber location comprises one and only one access device through which a plurality of subscriber devices at the subscriber location access multicast information distributed by the multicast distribution device, wherein each access device acts as a sole multicast receiver for its respective subscriber location and distributes multicast information received from the multicast distribution device to the subscriber devices at its respective subscriber location, and wherein each said access device operates by joining and leaving at least one multicast group as a substitute for the subscriber devices at its respective subscriber location, and wherein said access device processes a first join request received from one of said subscriber devices by determining whether said access device is already joined to a multicast group indicated by said join request, and, in the event that said access device is not already joined to said multicast group indicated by said join request, sending a second join request to said multicast distribution device, wherein said second join request is a request for said access device to join said multicast group, wherein said access device does not forward said first join request to said multicast distribution service, wherein said joining said multicast group by said access device as a substitute for the subscriber devices includes authenticating, in response to said second join request, said access device by said multicast distribution device, and wherein said multicast distribution device does not authenticate said subscriber devices at said subscriber location for said access device prior to said access device distributing to each of said subscriber devices at said subscriber location for said access device multicast information sent to said access device by said multicast distribution device over multicast routes established to said access device from said multicast distribution device in response to said multicast distribution device successfully authenticating said access device and said access device having joined said multicast group as a result of said successful authentication.

5. The multicast communication system of claim 1, wherein each access device is coupled to a separate interface of the multicast distribution device.

6. The multicast communication system of claim 5, wherein the multicast distribution device identifies each access device based upon the interface to which the access device is coupled.

7. The multicast communication system of claim 5, wherein each access device joins multicast groups maintained by the multicast distribution device on behalf of its respective subscriber devices using a multicast group management protocol.

8. The multicast communication system of claim 7, wherein the multicast distribution device sends multicast information to the access devices based upon multicast group memberships of the access devices.

9. The multicast communication system of claim 7, wherein each access device distributes multicast information received from the multicast distribution device to its respective subscriber devices.

10. The multicast communication system of claim 4, wherein the multicast distribution device maintains accounting information for each subnetwork.

11. The multicast communication system of claim 10, wherein the accounting information comprises multicast group memberships for each subnetwork.

12. The multicast communication system of claim 11, wherein the accounting information comprises a duration for each multicast group membership for each subnetwork.

13. The multicast communication system of claim 11, wherein the accounting information comprises a volume of multicast information for each multicast group membership for each subnetwork.

14. In a communication system having a multicast distribution device coupled to a plurality of subscriber locations, each subscriber location having an access device and a plurality of subscriber devices, wherein each access device acts as a sole multicast receiver for its respective subscriber location and distributes multicast information received from the multicast distribution device to the subscriber devices at its respective subscriber location, and wherein each said access device acts to join and leave at least one multicast group on behalf of the subscriber devices at its respective subscriber location, an access control method comprising:

maintaining a number of multicast groups by the multicast distribution device; and     joining one of said number of multicast groups by a first subscriber device, wherein joining one of said number of multicast groups by the first subscriber device comprises:

sending a first join request by the first subscriber device to an access device using a first multicast group management protocol;

determining, by said access device, whether said access device is already joined to a multicast group indicated by said join request; in the event that said access device is not already joined to said multicast group indicated by said join request, joining the multicast group by the access device as a substitute for the first subscriber device by sending a second join request to said multicast distribution device, wherein said second join request is a request for said access device to join said multicast group, wherein said access device does not forward said first join request to said multicast distribution service, and authenticating, in response to said second join request, said access device by said multicast distribution device, and wherein said multicast distribution device does not authenticate said subscriber devices at said subscriber location for said access device prior to said access device distributing to each of said subscriber devices at said subscriber location for said access device multicast information sent to said access device by said multicast distribution device over multicast routes established to said access device from said multicast distribution device in response to said multicast distribution device successfully authenticating said access device and said access device having joined said multicast group as a result of said successful authentication; and     associating, in response to said first join request, the first subscriber device with the multicast group by the access device.

15. The access control method of claim 14, wherein authenticating the access device by the multicast distribution device comprises:

identifying the access device by the multicast distribution device.

16. The access control method of claim 15, wherein the access device is coupled to an interface of the multicast distribution device, and wherein identifying the access device by the multicast distribution device comprises:

identifying the access device based upon the interface over which the second join request is received by the multicast distribution device.

17. The access control method of claim 14, wherein authenticating the access device by the multicast distribution device comprises:

authenticating the access device using a predetermined authentication scheme.

18. The access control method of claim 17, wherein the predetermined authentication scheme comprises IPsec AH.

19. The access control method of claim 14, further comprising:

determining by the multicast distribution device that the access device is authentic; and     establishing a multicast group membership for the access device by the multicast distribution device.

20. The access control method of claim 14, further comprising:

determining by the multicast distribution device that the access device is not authentic; and     denying a multicast group membership for the access device by the multicast distribution device.

21. The access control method of claim 14, wherein associating the first subscriber device with the multicast group by the access device comprises:

maintaining by the access device a list of subscriber devices associated with the multicast group; and     adding the first subscriber device to the list of subscriber devices associated with the multicast group.

22. The access control method of claim 14, further comprising:

leaving the multicast group by the first subscriber device;

leaving the multicast group by the access device on behalf of the first subscriber device; and     disassociating the first subscriber device from the multicast group by the access device.

23. The access control method of claim 14, further comprising:

joining the multicast group by a second subscriber device, wherein joining the multicast group by the second subscriber device comprises:

sending a third join request by the second subscriber device to the access device using a third multicast group management protocol; and     associating, in response to the third join request, the second subscriber device with the multicast group by the access device.

24. The access control method of claim 23, further comprising:

leaving the multicast group by one of the first subscriber device and the second subscriber device;

remaining joined to the multicast group by the access device on behalf of the remaining subscriber device; and     disassociating said one of the first subscriber device and the second subscriber device from the multicast group by the access device.

25. The access control method of claim 14, further comprising:

maintaining accounting information by the multicast distribution device for each multicast group for each subscriber location.

26. An apparatus for operating as a sole multicast receiver on behalf of a plurality of subscriber devices at a subscriber location in a multicast communication network, the apparatus comprising:

a network interface couplable to a multicast distribution device;

a subscriber interface couplable to the number of subscriber devices at the subscriber location; and     switching logic interposed between the network interface and the subscriber interface, wherein the switching logic is operably coupled to join and leave multicast groups maintained by the multicast distribution device as a substitute for the plurality of subscriber devices at the subscriber location and forward multicast information to the subscriber devices at the subscriber location, and wherein said switching logic processes a first join request received from a first one of said subscriber devices by determining whether said apparatus is already joined to a multicast group indicated by said join request, and, in the event that said apparatus is not already joined to said multicast group indicated by said join request, sending a second join request to said multicast distribution device, wherein said second join request is a request for said apparatus to join said multicast group, wherein said switching logic does not forward said first join request to said multicast distribution device, and wherein said joining said multicast group by said access device as a substitute for the subscriber devices includes authenticating, in response to said second join request, said access device by said multicast distribution device, and wherein said multicast distribution device does not authenticate said subscriber devices at said subscriber location for said access device prior to said access device distributing to each of said subscriber devices at said subscriber location for said access device multicast information sent to said access device by said multicast distribution device over multicast routes established to said access device from said multicast distribution device in response to said multicast distribution device successfully authenticating said access device and said access device having joined said multicast group as a result of said successful authentication.

27. The apparatus of claim 26, wherein the switching logic comprises:
    first multicast group management logic operably coupled to control first multicast group memberships between the apparatus and the subscriber devices;
    second multicast group management logic operably coupled to control second multicast group memberships between the apparatus and the multicast distribution device; and
    membership logic operably coupled to maintain said first and second multicast group memberships.

28. The apparatus of claim 27, wherein the first multicast group management logic comprises Internet Group Management Protocol (IGMP) logic for exchanging multicast group membership information with the subscriber devices.

29. The apparatus of claim 27, wherein the second multicast group management logic comprises Internet Group Management Protocol (IGMP) logic for exchanging multicast group membership information with the multicast distribution device.

30. The apparatus of claim 27, wherein the membership logic is operably coupled to associate the first multicast group memberships with the second multicast group memberships.

31. The apparatus of claim 27, wherein the membership logic is operably coupled to maintain a list of subscriber devices for each of said second multicast group memberships.

32. The apparatus of claim 27, wherein the first multicast group management logic is operably coupled to receive the first join request.

33. The apparatus of claim 32, wherein the second multicast group management logic is operably coupled to join the multicast group instead of the first one of said subscriber devices.

34. The apparatus of claim 32, wherein the membership logic is operably coupled to associate the first one of the subscriber devices with the multicast group in response to the first join request.

35. The apparatus of claim 27, wherein the first multicast group management logic is operably coupled to determine that a subscriber device has left a multicast group.

36. The apparatus of claim 35, wherein the membership logic is operably coupled to disassociate the subscriber device from the multicast group.

37. The apparatus of claim 36, wherein the second multicast group management logic is operably coupled to determine whether there are any remaining subscriber devices associated with the multicast group based upon the membership information maintained by the membership logic.

38. The apparatus of claim 37, wherein the second multicast group management logic is operably coupled to remain a member of the multicast group upon determining that there is at least one remaining subscriber device associated with the multicast group.

39. The apparatus of claim 37, wherein the second multicast group management logic is operably coupled to leave the multicast group upon determining that there are no remaining subscriber devices associated with the multicast group.

40. A computer readable storage medium having stored thereon a computer program for, when executed on a microprocessor, controlling a computer system, the computer program comprising:
    network interface logic for communicating with a multicast distribution device;
    subscriber interface logic for communicating with a plurality of subscriber devices at a subscriber location; and
    switching logic logically interposed between the network interface logic and the subscriber interface logic, wherein the switching logic is programmed to join and leave multicast groups maintained by the multicast distribution device as a substitute for the plurality of subscriber devices and forward multicast information to the plurality of subscriber devices, and wherein said switching logic processes a first join request received from one of said subscriber devices by determining whether said switching logic is already joined to a multicast group indicated by said first join request, and, in the event that said switching logic is not already joined to said multicast group indicated by said first join request, sending a second join request to said multicast distribution device, wherein said second join request is a request for an access device including said switching logic to join said multicast group, wherein said switching logic does not forward said first join request to said multicast distribution device, and wherein said joining said multicast group as a substitute for the subscriber devices includes authenticating, in response to said second join request, an access device including said switching logic, said network interface logic, and said subscriber interface logic, by said multicast distribution device, and wherein said multicast distribution device does not authenticate said subscriber devices at said subscriber location for said access device prior to said access device distributing to each of said subscriber devices at said subscriber location for said access device multicast information sent to said access device by said multicast distribution device over multicast routes established to said access device from said multicast distribution device in response to said multicast distribution device successfully authenticating said access device and said access device having joined said multicast group as a result of said successful authentication.

41. The computer readable storage medium of claim 40, wherein the switching logic comprises:
    first multicast group management logic programmed to control first multicast group memberships between the computer system and the subscriber devices;
    second multicast group management logic programmed to control second multicast group memberships between the computer system and the multicast distribution device; and
    membership logic programmed to maintain said first and second multicast group memberships.

42. The computer readable storage medium of claim 41, wherein the first multicast group management logic comprises Internet Group Management Protocol (IGMP) logic for exchanging multicast group membership information with the subscriber devices.

43. The computer readable storage medium of claim 41, wherein the second multicast group management logic comprises Internet Group Management Protocol (IGMP) logic for exchanging multicast group membership information with the multicast distribution device.

44. The computer readable storage medium of claim 41, wherein the membership logic is programmed to associate the first multicast group memberships with the second multicast group memberships.

45. The computer readable storage medium of claim 41, wherein the membership logic is programmed to maintain a list of subscriber devices for each of said second multicast group memberships.

46. The computer readable storage medium of claim 41, wherein the first multicast group management logic is programmed to receive the first join request.

47. The computer readable storage medium of claim 46, wherein the second multicast group management logic is programmed to join the multicast group instead of said one of said subscriber devices.

48. The computer readable storage medium of claim 41, wherein the membership logic is programmed to associate said one of said subscriber devices with the multicast group in response to said first join request.

49. The computer readable storage medium of claim 41, wherein the first multicast group management logic is programmed to determine that a subscriber device has left a multicast group.

50. The computer readable storage medium of claim 49, wherein the membership logic is programmed to disassociate the subscriber device from the multicast group.

51. The computer readable storage medium of claim 50, wherein the second multicast group management logic is programmed to determine whether there are any remaining subscriber devices associated with the multicast group based upon the membership information maintained by the membership logic.

52. The computer readable storage medium of claim 51, wherein the second multicast group management logic is programmed to remain a member of the multicast group upon determining that there is at least one remaining subscriber device associated with the multicast group.

53. The computer readable storage medium of claim 51, wherein the second multicast group management logic is programmed to leave the multicast group upon determining that there are no remaining subscriber devices associated with the multicast group.

\* \* \* \* \*